United States Patent
Michelitsch et al.

(10) Patent No.: US 11,473,932 B2
(45) Date of Patent: Oct. 18, 2022

(54) POSITION ENCODER ARRANGEMENT AND METHOD FOR DETERMINING A FAILURE STATUS OF SUCH ARRANGEMENT

(71) Applicant: ams AG, Premstaetten (AT)

(72) Inventors: Stephan Michelitsch, Eindhoven (NL); Gerhard Oberhoffner, Eindhoven (NL)

(73) Assignee: AMS AG, Premstätten (AT)

( * ) Notice: Subject to any disclaimer, the term of this patent is extended or adjusted under 35 U.S.C. 154(b) by 39 days.

(21) Appl. No.: 16/972,078

(22) PCT Filed: May 16, 2019

(86) PCT No.: PCT/EP2019/062669
§ 371 (c)(1),
(2) Date: Dec. 4, 2020

(87) PCT Pub. No.: WO2019/233730
PCT Pub. Date: Dec. 12, 2019

(65) Prior Publication Data
US 2021/0172763 A1 Jun. 10, 2021

(30) Foreign Application Priority Data
Jun. 5, 2018 (EP) .................................. 18176011

(51) Int. Cl.
*G01D 3/08* (2006.01)
*G01D 5/244* (2006.01)

(52) U.S. Cl.
CPC ........... *G01D 3/08* (2013.01); *G01D 5/24457* (2013.01)

(58) Field of Classification Search
CPC ............... G01D 3/08; G01D 5/24457
See application file for complete search history.

(56) References Cited

U.S. PATENT DOCUMENTS

| 9,007,057 | B2 | 4/2015 | Villaret |
| 2014/0243750 | A1* | 8/2014 | Larsen .............. A61M 5/31525 604/218 |

(Continued)

FOREIGN PATENT DOCUMENTS

| CN | 102261922 A | 11/2011 |
| CN | 102341674 A | 2/2012 |

(Continued)

OTHER PUBLICATIONS

International Search Report and Written Opinion in corresponding PCT Application No. PCT/EP2019/062669 dated Aug. 30, 2019, 8 pages.

(Continued)

*Primary Examiner* — Walter L Lindsay, Jr.
*Assistant Examiner* — Milton Gonzalez
(74) *Attorney, Agent, or Firm* — MH2 Technology Law Group LLP

(57) ABSTRACT

A position encoder arrangement is configured to detect the position of a movable source based on a source field, which is a magnetic field or an electric field, emitted by the source. The position encoder arrangement includes a number of sensor elements that are evenly distributed and each is configured to provide a sensor value based on the source field at the sensor element's location. The arrangement further includes an evaluation unit that is configured to determine a fine position value for the position of the movable source, and to determine from the sensor values a trustworthiness of the fine position value and/or an error flag indicating whether a failure status of the position encoder arrangement is present.

16 Claims, 5 Drawing Sheets

(56) References Cited

U.S. PATENT DOCUMENTS

2015/0070001 A1    3/2015  Villaret
2017/0232203 A1*  8/2017  Krusell ................... A61M 5/24
                                                                            604/207

FOREIGN PATENT DOCUMENTS

| CN | 102341675 A | 2/2012 |
| CN | 102435215 A | 5/2012 |
| EP | 3312567 A1 | 4/2018 |
| WO | 2018025261 A1 | 2/2018 |

OTHER PUBLICATIONS

Chinese Search Report in Chinese Application No. 2019800349691 dated Mar. 23, 2022, 8 pages.

* cited by examiner

POSITION ENCODER ARRANGEMENT AND METHOD FOR DETERMINING A FAILURE STATUS OF SUCH ARRANGEMENT

BACKGROUND OF THE INVENTION

The present disclosure relates to a position encoder arrangement and to a method for determining a failure status of such an arrangement.

Position encoders are widely used in various applications that require the determination of an absolute or relative position of a movable object. For the purpose of such measurements, corresponding position encoders typically comprise several sensors that are arranged along a movement axis of the movable object, wherein the sensors are configured to detect a source field emitted by the movable object. Depending on a geometrical protection of the source field vector generated by the movable object onto respective axes of the sensors, corresponding sensor values are generated and used to determine the local source field at the position of each of the sensors. The measured quantity can be derived from the sensor values, for example an angle in the case of a rotary position encoder.

The respective sensor arrangements usually comprise further signal amplifiers and often analog-to-digital converters together with an evaluation unit for evaluating the digital signals in order to determine the position of the movable object.

In the case that one or more of the concerned elements, for example the sensors, the amplified circuitry or the evaluation unit, has a failure, the determination of the quantity to be measured can be erroneous. Moreover, if at least one of the sensors is malfunctioning and not working as expected but still delivering a sensor signal, the error may not be detected in conventional systems. Such a situation may be critical, in particular for automotive or security relevant applications.

SUMMARY OF THE INVENTION

This disclosure provides a failure detection concept, which allows to determine a failure status of a position encoder arrangement with improved reliability.

The failure detection concept is based on the idea that by using a position encoder arrangement with a number of sensor elements that are arranged with a known geometrical distribution, e.g. evenly distributed, the sensor values provided by the sensor elements cannot only be used for the determination of the position of the movable object but also used as a functional safety, FUSA, feature, with which a potential failure status is determined. The FUSA is based on a different signal evaluation of the sensor values compared to that of the position measurement. In particular, this different signal evaluation is based on a comparison of each of the sensor values from the sensor elements against a threshold value. If this threshold value is chosen appropriately, for evenly distributed sensor elements ideally half of the sensor values are larger while the other half of the sensor values are smaller than the threshold value, assuming that the source field generated by the movable object is dominant and an external field is substantially constant for all sensor elements. From the result of the comparison an algorithm can calculate a coarse value of the position. By comparing the conventionally determined position of the movable object with this coarse position a flag for the functionality and trustworthiness of the system can be generated. In addition the trustworthiness of the coarse position measurement can be determined as well.

The failure detection concept allows, for example, detecting a broken or degraded sensor element or connected signal processing circuits in a position encoder arrangement. For all configurations, the failure detection can be performed at least partially in parallel to a conventional position determination.

According to an example implementation of the failure detection concept, a position encoder arrangement is configured to detect the position of a movable source based on a source field, which is a magnetic field or an electric field and is emitted by the source. The sensor arrangement comprises a number of sensor elements that are arranged with a known geometrical distribution, e.g., evenly distributed, wherein each sensor element is configured to provide a sensor value based on the source field. The sensor arrangement further comprises an evaluation unit, which is configured to determine, based on the sensor values, a fine position value indicating the position of the movable source. In addition, the evaluation unit is further configured to generate from the sensor values a sensor array of binary signals that each correspond to one of the sensor values and indicate whether the corresponding sensor value is smaller or larger than a threshold value. Based on the sensor array, the evaluation unit is further configured to determine a trustworthiness of the fine position value and/or an error flag indicating whether a failure status of the position encoder arrangement is present.

Optionally, the threshold value is chosen to be zero such that the evaluation unit is configured to determine whether each of the sensor values is positive or negative, i.e. the measured source field is larger or smaller than zero. In addition, the sensor elements are ideally arranged such that a fixed number of sensor values are positive, while the remaining show a negative sensor value. In particular for rotary encoders, the arrangement is configured such that half of the sensor values are positive and the other half are negative for an equal distribution of the sensor elements.

In some embodiments, for determining the error flag a movement range of the movable source is partitioned into a number of position sectors corresponding to the number of sensor elements, with the position sectors being of known size, e.g. equal size, and each of the position sectors being assigned to a distinct sector array. The evaluation unit in these embodiments is configured to match the sensor array against each of the sector arrays and to record the result of the matching in a pattern array. The evaluation unit then determines the error flag based on the pattern array.

For example, for a system with N sensor elements, wherein 'N' is an integer number, the sensor array is composed of N individual bit values, wherein each bit value indicates whether the corresponding sensor value is smaller or larger than the threshold value. Correspondingly, the movement range is partitioned into N position sectors that each have assigned a distinct N-bit sector array. The bits of each sector array indicate expected values of the sensor elements if the position of the movable object lies within the respective position sector. In particular, a certain number of bits in each sector array may be indefinite, i.e. left as a blank or a placeholder. Typically, the number of sensor elements is 8 or 16, for example, but can also be larger or smaller depending on the desired system.

In various embodiments of the arrangement, the pattern array consists of a number of bits with the number of bits corresponding to the number of position sectors. Each bit of the pattern array thereby corresponds to one of the position sectors and indicates whether the sensor array coincides with the respective sector array. The error flag in these embodiments is determined based on coinciding sector arrays.

The evaluation unit in such an embodiment compares the sensor array with each of the N sector arrays and records as binary bits whether the sensor array coincides with the respective sector array, thus forming an N-bit pattern array. As a result, each bit of the pattern array represents one of the position sectors and indicates coincidence with the respective sensor array. In particular for sector arrays with a number of indefinite bits, more than one sector array may coincide with the sensor array.

In various embodiments, the error flag signals no warning if a fixed number, in particular three, of adjacent bits of the pattern array as the only bits imply coinciding sector arrays. Moreover, the error flag in these embodiments signals a warning indicating a disturbance if at least one but less than the fixed number of adjacent bits of the pattern array as the only bits imply coinciding sector arrays, and an error otherwise.

For example, while three adjacent coinciding sector arrays indicate a well-performing position encoder arrangement and hence not causing any warning, having only one or two adjacent coinciding sector arrays may indicate an operation of the position encoder arrangement close to a fail boundary, for instance. The error flag in this case generates a warning indicating a disturbed position measurement, for example. The pattern array comprising non-adjacent bits indicating coinciding sector arrays may be caused by malfunctioning sensor elements, for example. Having no coinciding sector arrays at all may imply a not well-placed movable source, for example. These two cases lead to the error flag generating an error.

In various embodiments, for determining the trustworthiness the evaluation unit is configured to determine an effective sector value from the pattern array, and to determine from this effective sector value a coarse position value indicating the position of the movable source. The evaluation unit in these embodiments is further configured to determine a deviation between the coarse position value and the fine position value, and to determine, based on the deviation, a further error flag indicating the trustworthiness.

Generating from the pattern array an effective sector value, for example by calculating a mean of the position sectors with coinciding sector arrays, allows for an estimation of the position of the movable source as a coarse position value. This may be compared to the conventionally determined fine position value and, based on a deviation between the two values, a further error flag may be generated indicating a magnitude of the deviation.

In addition or alternatively, in particular during a displacement of the movable source, in some embodiments a first and a second speed vector is generated from a sequence of fine position values and from a sequence of coarse position values, respectively. The evaluation unit in these embodiments is further configured to determine, based on the first and the second speed vector, an additional error flag indicating the trustworthiness.

In case the first and the second speed vector show no or sufficiently small deviation, the additional error flag may indicate no warning, while it may indicate a warning or an error otherwise.

In various embodiments, the position encoder is a linear encoder, or a rotary position encoder, wherein the position of the movable source corresponds to a rotation angle of the movable source.

In some embodiments of the position encoder arrangement, the source field is a magnetic field and the evaluation unit is further configured to compensate the sensor values for a stray field in the analog domain or in the digital domain.

In embodiments in which the movable object is a magnet, for example, a stray field may occur that influences the sensor values. In particular for the generation of the sensor array, this influence may lead to false comparison results for certain sensor elements, depending on the size of the stray field. The evaluation unit therefore may be further configured to estimate the stray field based on the sensor values, and to compensate for it. The compensation may be performed either in the analog or in the digital domain. For example, the stray field is subtracted from the sensor value before further signal evaluation or the threshold value is set to equal the calculated stray field.

In some embodiments, the evaluation unit is further configured to compensate the sensor values for an external background field.

As also possible external fields influence the sensor elements, the evaluation unit in these embodiments is therefore further configured to correct the sensor values for the background field, for example by means of a DC field compensation for each of the sensor elements.

In various embodiments of the position encoder arrangement, the sensor values are generated simultaneously or within a given time.

In some embodiments, the evaluation unit is further configured to adapt the fine position value based on the error flag.

For example, in the case that one of the sensor elements is malfunctioning and consistently generating the same sensor value regardless of the measured source field, the evaluation unit may be configured to ignore this sensor value and to replace it with another sensor value multiplied with a correction factor. For example for a rotary encoder, the other sensor value may be the sensor value from the sensor element arranged opposite of the malfunctioning sensor element, which is multiplied by the correction factor of −1. The system in this case may output an adapted fine position value together with the error flag indicating a warning. However, adapting of the fine position value based on the error flag relies on precise knowledge of the magnitude of a potential background field.

In the following, a method for determining a failure status of a position encoder arrangement according to the failure detection concept is disclosed. Such a position encoder arrangement has a number of evenly distributed sensor elements and a movable source emitting a source field, which is an electric field or a magnetic field. According to the method, a fine position value indicating a position of the movable source is determined from sensor values provided by the sensor elements based on the source field. The method further comprises generating from the sensor values a sensor array of binary signals, with each binary signal corresponding to one of the sensor values and indicating whether the corresponding sensor value is smaller or larger than a threshold value. Based on the sensor array, a trustworthiness of the fine position value and/or an error flag indicating whether a failure status of the position encoder arrangement is present is determined.

Various embodiments and implementations of such a method become apparent to the skilled reader from the description of the various embodiments of the position encoder arrangement described above.

For a magnetic source field, the sensor elements employed in the various embodiments can be Hall sensors like lateral Hall sensors or vertical Hall sensors, for example in CMOS implementation. However, other magnetic field sensors, for example using a magneto resistive effect, or various types of electric field sensors can also be used with the failure detection concept, based on the type of the source field. For example, if the source field is an electric field, sensor types, such as inductive or capacitive sensors can be employed for the position determination and the failure detection concept. If the source field is an electromagnetic field, the sensor elements can be light sensors, for instance.

BRIEF DESCRIPTION OF THE DRAWINGS

The invention will be described in detail below for several embodiments with reference to the drawings. Identical reference numerals designate elements or components with identical functions. Insofar as elements or components correspond to one another in function, a description of them will not be repeated in each of the following figures.

In the drawings.

DETAILED DESCRIPTION

Figure 1:
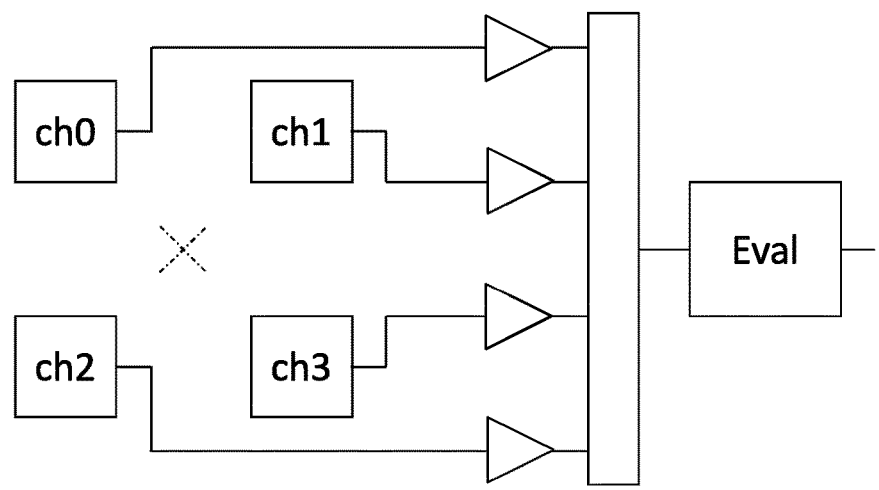
FIG. 1 shows an example embodiment of a position encoder arrangement employing the failure detection concept.

FIG. 1 shows an example embodiment of a position encoder arrangement depicted on a block diagram basis. The arrangement is a rotary encoder arrangement and comprises four magnetic field sensor elements ch0-ch3 evenly distributed and arranged symmetrically with respect to a rotation axis indicated by a dash-dotted hairline cross. The encoder arrangement is configured to measure the magnetic source field emitted by a rotatable magnetic source that optionally is placed over the sensor elements such that the rotation axis of the magnetic source coincides with the rotation axis of the sensor elements. In practical realizations the rotation axis of the magnetic source and the rotation axis of the sensor elements may be displaced with respect to each other.

Each of the magnetic field sensors ch0-ch3, which for example are formed by Hall sensors like CMOS Hall sensors, provides a respective sensor value corresponding to the intensity of the magnetic field sensed at the sensor's position. Respective sensor signals of the magnetic field sensors are combined after respective amplification and provided to an evaluation unit Eval.

The evaluation unit Eval may perform signal evaluation in order to determine the rotation angle of the magnetic source as a fine position value, which is well-known in the art. However, according to the failure detection concept the evaluation unit Eval is further configured to compare each sensor value to a threshold value and, depending on whether the respective sensor value is larger or smaller than the threshold value, generate a binary signal of value '1' or '0'. The results of all comparisons, i.e. the binary signals of all sensor values, are combined into a sensor array with its size corresponding to the number of sensor elements. For example, a sensor array is given by '0110' for a given rotation angle of the magnetic source.

Figure 2:
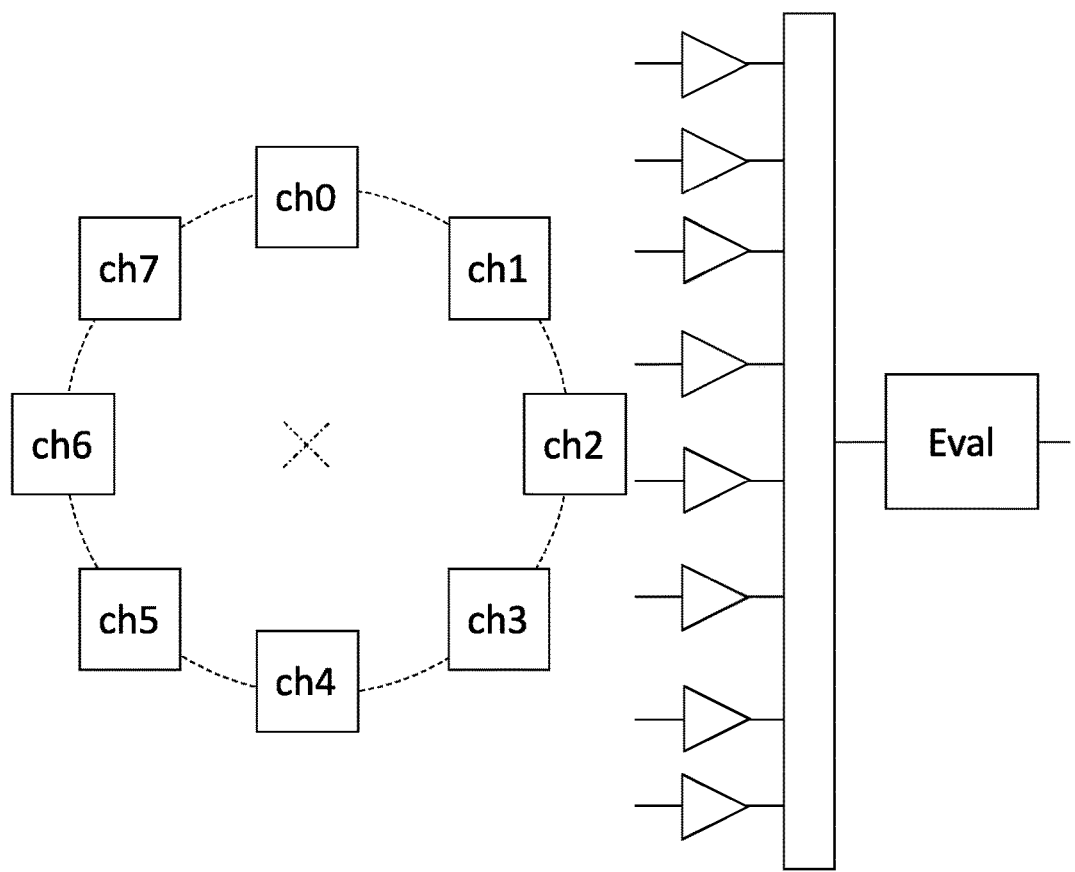
FIG. 2 shows a further example embodiment of a position encoder arrangement employing the failure detection concept.

FIG. 2 shows a further example embodiment of a position encoder arrangement that is based on that of FIG. 1, having eight magnetic field sensors ch0-ch7 that are evenly distributed and arranged symmetrically with respect to a rotation axis indicated by a dash-dotted hairline cross. The same principles as described in FIG. 1 also apply here. Correspondingly, the sensor array in this embodiment is composed of eight bits, for example '00111100' for a given rotation angle of the magnetic source.

Figure 3:
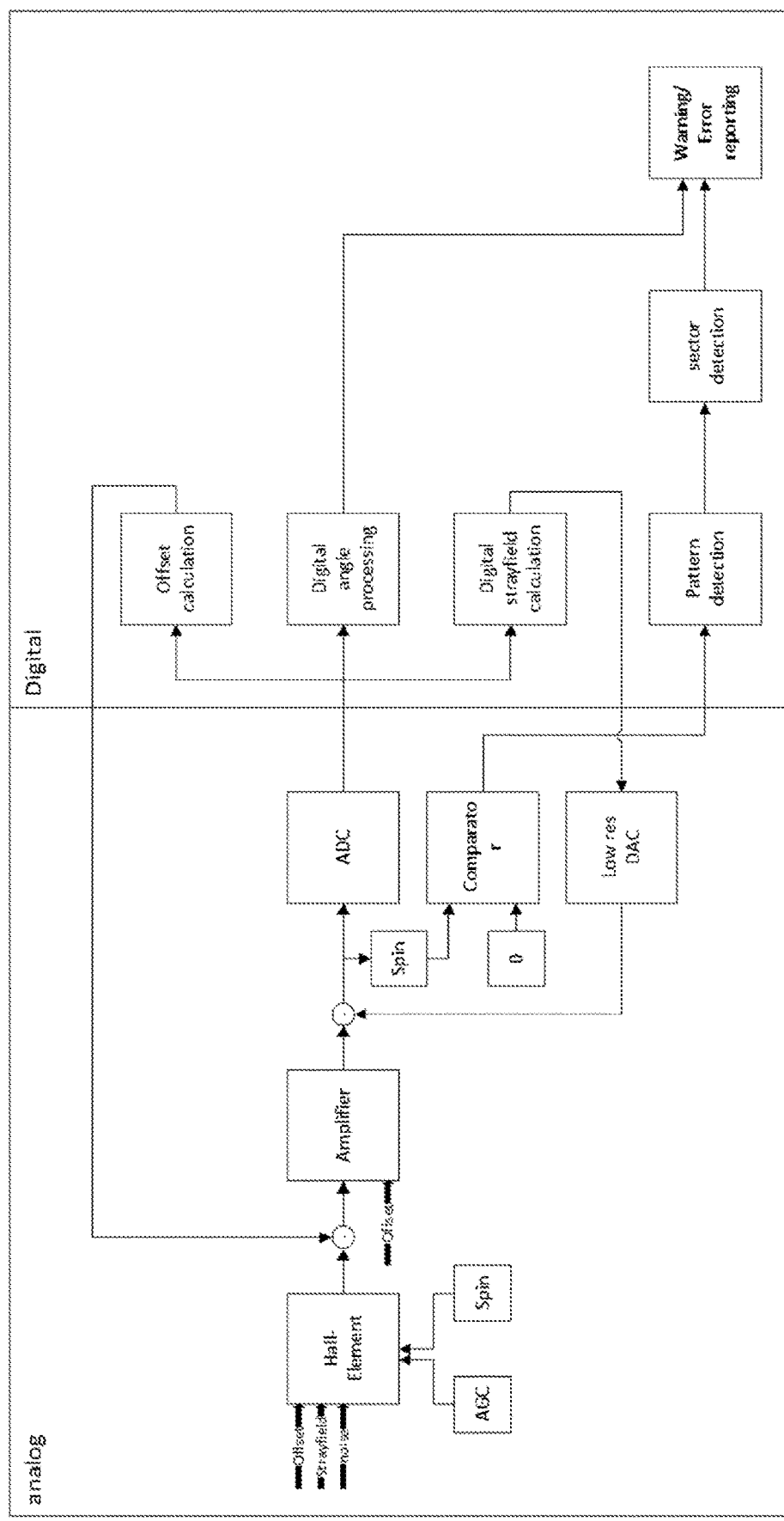
FIG. 3 shows a further example embodiment of a position encoder arrangement employing the failure detection concept.

FIG. 3 shows a further example embodiment of a position encoder arrangement that is based on the embodiment of FIGS. 1 and 2 and further details the working principle of the evaluation unit according to some implementations. For simplicity, the embodiment shown solely comprises a single Hall-element with automatic gain control, AGC, and spinning current, for instance. On top of the source field, the Hall-element is susceptible to a stray field of the magnetic source as well as noise and a possible offset, for example due to an external field.

The Hall sensor generates a sensor value depending on the magnetic field at the sensor's location, which is typically amplified before further evaluation. The amplification may introduce an additional offset. The output signal of the amplifier is provided to an analog-to-digital converter, ADC, as well as to a comparator, which compares the sensor value to a threshold, in this case a value of zero, and outputs a binary signal of value '1' if the sensor value is positive or of value '0' if the sensor value is negative.

For a position encoder arrangement according to the failure detection concept, the comparator generates a sensor array with a binary value as described above for each of the sensor values. For example, by employing a switching unit between the sensor amplifiers and the path to the ADC and to the comparator, the evaluation circuit may process the sensor values successively.

The output of the ADC in this embodiment is evaluated in three different ways. First, the digitized sensor values are evaluated to calculate the DC compensation field to compensate for an offset due to a background field. For instance, to this end, the evaluation unit calculates difference values from the sensor values of opposing sensor elements, for example ch0 and ch4 in an eight-sensor arrangement as shown in FIG. 2. The difference corresponds or is proportional to the offset induced by an external field, for example. The evaluation unit may then correct for this offset by directly subtracting the offset from the sensor values.

Second, the digitized sensor values are evaluated to generate the fine position value in a conventional manner Third, the sensor values are used to calculate the stray field and a potential DC field induced by the magnetic source. The stray field corresponds to the arithmetic mean of the sensor values, for example. For correcting the sensor values, the calculated stray field may be subtracted, after converting it back to the analog domain using a digital-to-analog converter, DAC, directly from the amplified sensor values. Alternatively, the stray field may be calculated in the analog domain, for example if the single-channel sensor values are non-existent in the digital domain.

The output of the comparator is used for the pattern detection, which generates the pattern array. For the pattern detection, the movement range according to some implementations is partitioned into a number of known parts corresponding to the number of sensor elements, thus defining position sectors. Each of the position sectors is assigned a distinct sector array, with the bits of each sector array indicating the expected sign of the respective sensor value, assuming that the rotation angle of the source lies within the respective position sector. In order to define a range of positions for each position sector, a certain number of bits in each sector array may be indefinite, i.e. left as a blank or a placeholder.

For example, for a system with 16 position sectors and four placeholders, 'X', the sector array for the first sector may be given by 'X111111XX000000X', that for the second may be given by 'XX111111XX000000' and so on.

For generating the pattern array, the sensor array is compared to each of the sector arrays and a bit of the pattern array of value '1' is recorded for a respective coinciding sector array and a bit of value '0' if the respective sector array does not coincide with the sensor array. For example for 16 sensor elements, a rotation angle of 5° of the movable source may result in a sensor array of '1111111100000000'. This sensor array coincides with the sector arrays of position sectors 0, 1 and 15, hence generating a pattern array with value '1000000000000011'.

The pattern array may be used for a threefold evaluation. First, the number and sector of coinciding sector arrays, i.e. the number and positions of bits with value '1' in the pattern array are analyzed. The evaluation unit may generate an error flag indicating no warning, if the pattern array exhibits three adjacent bits of value '1' and bits of value '0' for the remaining sites of the pattern array, as in the exemplary pattern array shown above. For only two adjacent bits that are the only bits of value '1' in the pattern array, a warning indicating a small disturbance might be generated as the error flag, while only one single bit of value '1' in the pattern array may cause the error flag to indicate a large disturbance. Disturbances may cause an unequal number of bits of value '0' and bits of value '1' in the sensor array. If none of the above-mentioned cases applies, the error flag may indicate an erroneous measurement, for example in case the pattern array only comprises bits of value '0' or non-adjacent bits of value '1'. For the example of rotary encoders discussed above, the channels may be labeled arbitrarily. In particular, in such an arrangement, the first and the last position sectors, 0 and 15 in this example, and hence the first and the last bit of the pattern array, are considered to be adjacent.

The second way, in which the pattern array may be evaluated, is the determination of an effective sector S as a mean from the bits of value '1' in the pattern array. For instance the effective sector may be determined to be sector 0 in the exemplary pattern array shown above. Using this effective sector S, a coarse estimation for the rotation angle Phi may be determined. It can be calculated using the formula Phi=$S*360°/N$, wherein N corresponds to the number of sensor elements, hence defining a resolution 360°/N of the estimation. This coarse position value can be compared to the conventionally determined fine position value and, depending on a deviation between these two values, a further error flag may be generated. For example, for deviations above a certain value, an error can be generated, while for intermediate deviations the error flag may correspond to a warning.

The number of placeholders in the sector arrays indicates the accuracy of the estimated coarse position value. For example, increasing the number of placeholders, for instance by defining the sector array of position sector 0 from the example above as 'XX1111XXXX0000XX' and the other position sectors accordingly, decreases the accuracy of the estimation, as more position sectors become coinciding to the sensor array. On the other hand, the system is less susceptible to disturbances and thus is able to generate an estimated coarse position value even for large disturbances.

For high signal quality, i.e. very low or no disturbance, the behavior of the pattern detection is the same regardless of the number of placeholders. For low signal quality, i.e. high disturbance, a pattern detection with an increased number of placeholders proves to be more reliable in a coarse position value estimation.

Third, in particular in addition to the second evaluation and during rotation of the magnetic source, a rotation vector describing direction and rotation speed can be determined from the pattern array and compared to the change of the fine position value with time. Based on this comparison, an additional error flag may then indicate whether there is a discrepancy between the rotation vector and the true rotation of the magnetic source.

Figure 4:
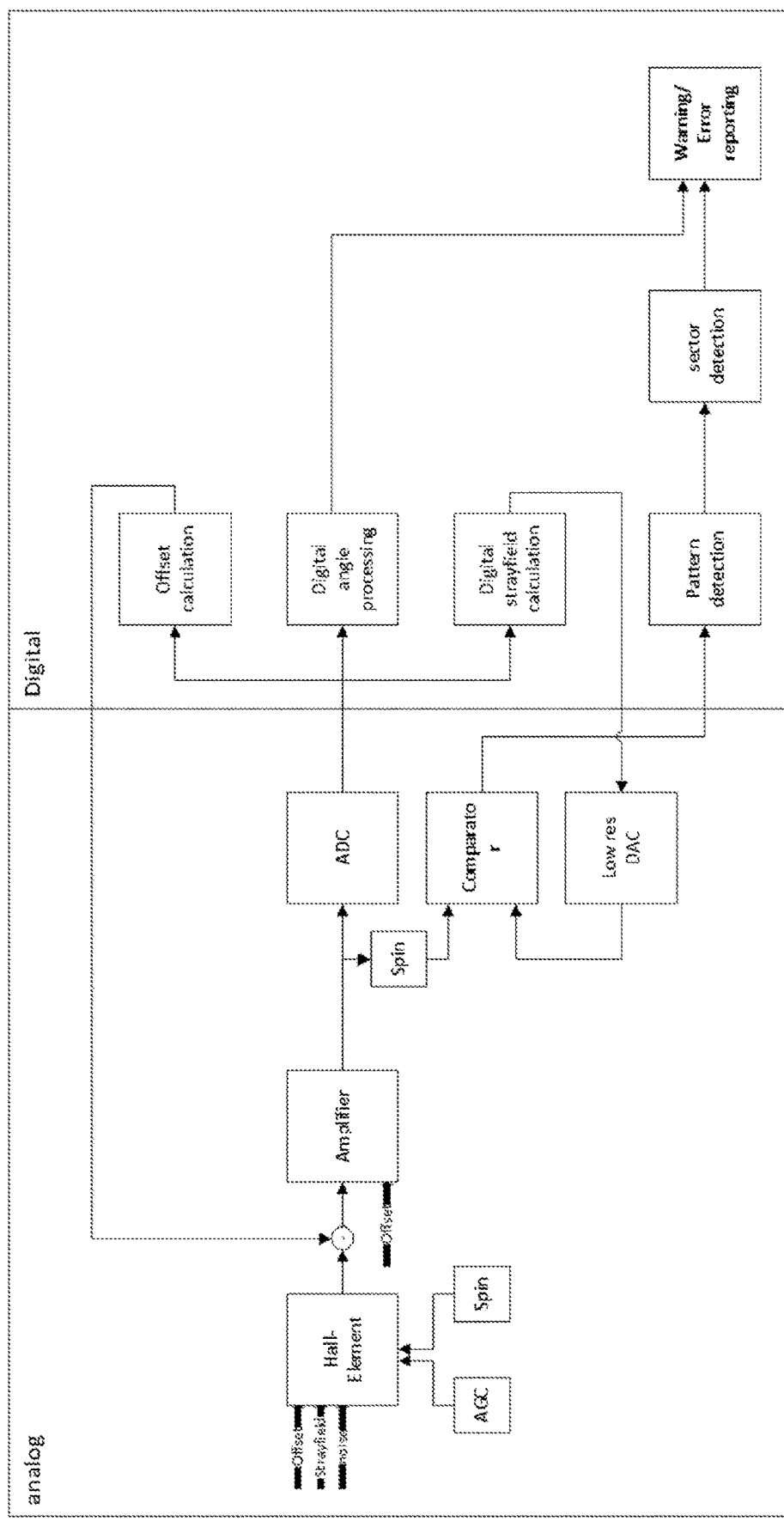
FIG. 4 shows a further example embodiment of a position encoder arrangement employing the failure detection concept.

FIG. 4 shows a further example embodiment of a position encoder arrangement that is based on the embodiment of FIGS. 1 and 2. In contrast to the embodiment shown in FIG. 3, the calculated stray field is compensated for in the digital domain. In detail, the stray field value is used as the threshold value at the comparator stage. The remaining evaluation is analogous to that presented and detailed in FIG. 3.

Alternative to calculating the stray field as a mean from the sensor values, different approaches can be utilized in order to generate a value for the stray field in various embodiments. One other solution is to evaluate the sensor array generated at the comparator stage by determining the average number of bits of value '1' and the average number of bits of value '0' over time, for example for a series of position measurements. If the number of bits with value '1' dominates, the value of the stray field needs to be increased. Accordingly, if the number of bits with value '0' dominates, the value of the stray field needs to be decreased.

A second way of compensating for the stray field is to, during the generation of the sensor array, quickly increase the value of the stray field until the number of '0's equals the number of '1's in the sensor array. Using one of these two approaches allows for the compensation of the stray field even if the latter cannot be calculated for whatever reason, for example due to non-existent individual sensor values.

Figure 5:
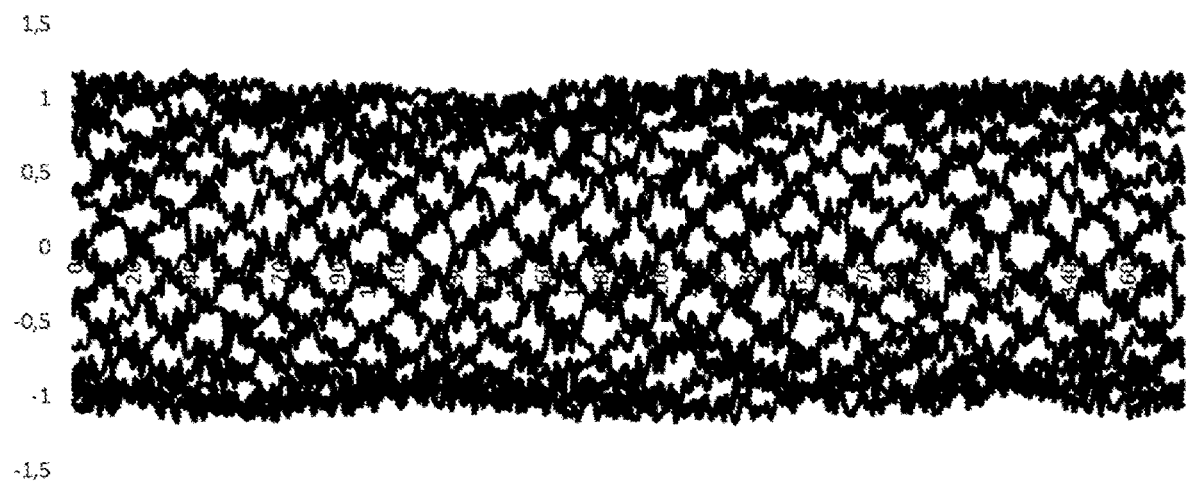
FIG. 5 shows simulated exemplary data of a position encoder arrangement employing the failure detection concept.

FIG. 5 shows an example of sensor values. In particular, the graph shows simulated sensor values normalized to its approximated amplitude versus rotation angle of the movable source in a rotary encoder arrangement with 16 channels, i.e. 16 sensor elements. The simulated data contains the source field measured at the location of each sensor with random noise on the sensor, a stray field and an offset. In addition, the simulated data also considers noise in the sensitivity of each sensor.

Figure 6:
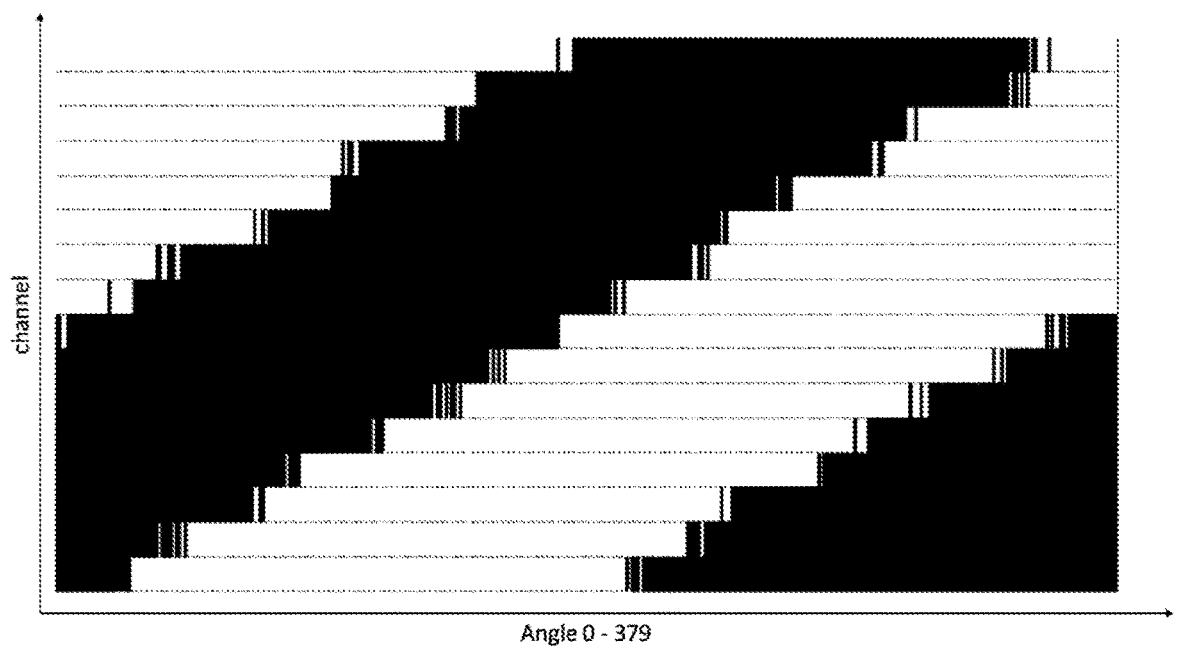
FIG. 6 shows an evaluation step of the simulated exemplary data according to the failure detection concept.

FIG. 6 shows the comparator output for the simulated data from FIG. 5. In particular, the comparator output for each of the sensor values, i.e. channels, is shown at angles between 0° and 379°. Black regions indicate the sensor data being larger than the threshold value, i.e. a binary comparator output of value '1', while the white regions indicate the sensor data being smaller than the threshold value, i.e. a binary comparator output of value '0'. All binary values, in this example 16 values, taken at a certain angle form the sensor array. The simulated data is corrected for in terms of the stray field according to one of the embodiments described above.

Figure 7:
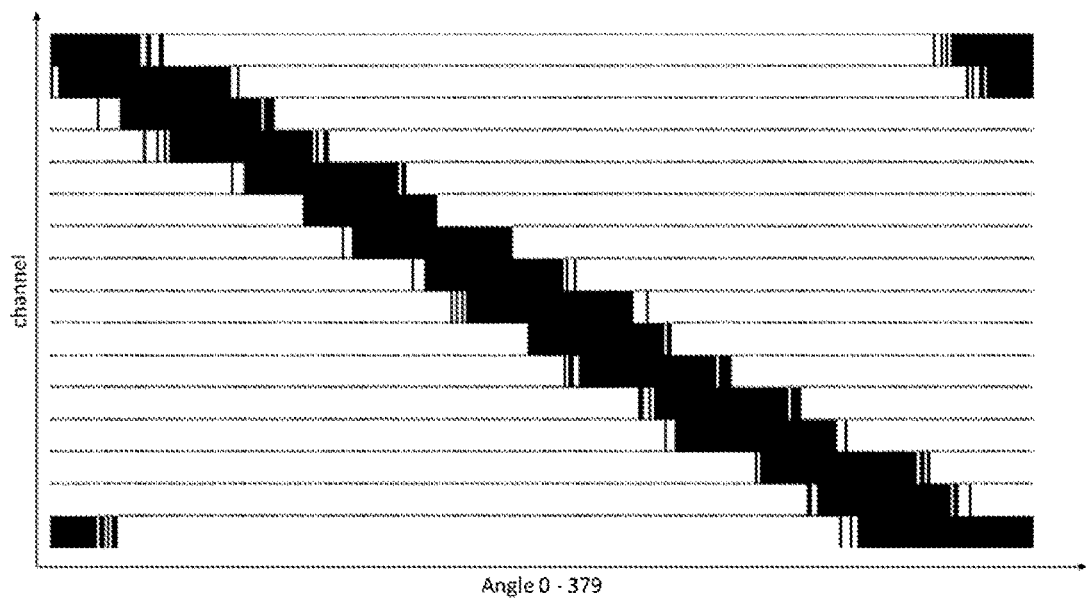
FIG. 7 shows a further evaluation step of the simulated exemplary data according to the failure detection concept.

FIG. 7 shows the analysis results of the comparator outputs of FIG. 6 for generating the pattern array. At each angle, the sensor array is compared to the sector arrays and the result of the comparison is recorded in binary form. In particular, the black regions indicate coinciding position sectors, hence a binary value '1' of the respective bit in the pattern array at a certain angle, while the white regions indicate no coincidence between the sensor array and the respective sector array, hence a binary value '0' of the respective bit in the pattern array.

Figure 8:
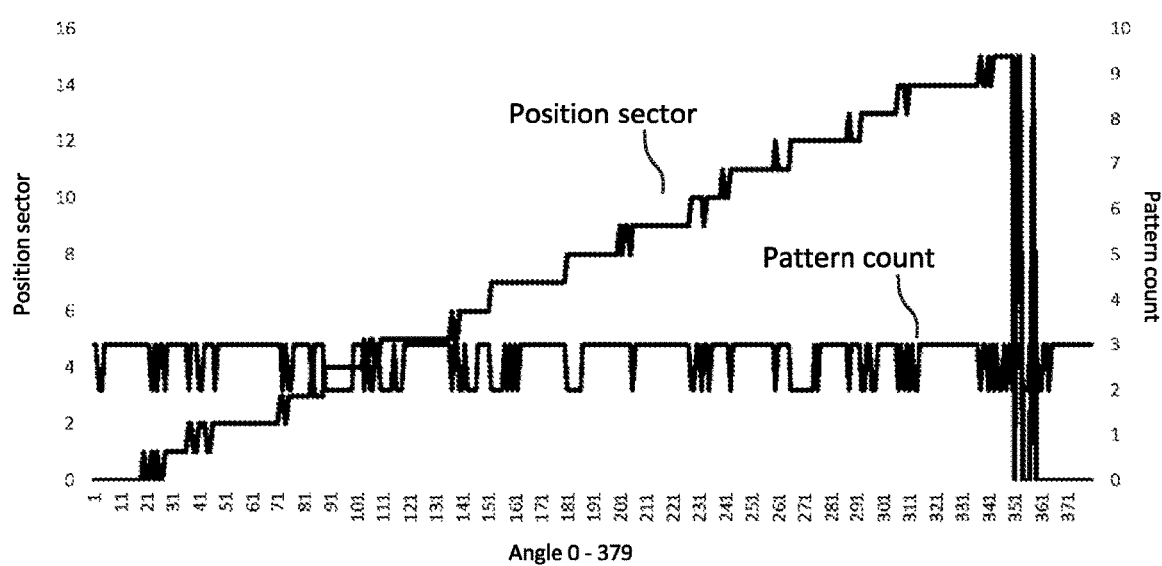
FIG. 8 shows a further evaluation step of the simulated exemplary data according to the failure detection concept.

FIG. 8 shows the evaluation of the pattern array of FIG. 7. On one hand, the pattern count indicates adjacent coinciding position sectors that in this case fluctuate between two and three versus the angle. As described above, this pattern count may indicate the level of disturbances, in this example a count of three indicates no disturbance, while a count of two indicates a small disturbance, for example due to the noise added in the simulated data of FIG. 5. On the other hand, from the pattern array, also an effective position sector is determined, which serves for the estimation of the rotation angle, i.e. a coarse position value.

While all of the above-mentioned embodiments describe rotary encoders, in particular magnetic rotary encoders with Hall sensor elements, and its evaluation steps, the failure detection concept also applies to other types of position encoders, such as magnetic linear position encoders as well as rotary and linear position encoders based on an electric source field. In case of an electric field, for example inductive or capacitive types of sensors may be employed for the determination of the position and the failure detection concept. If the source field is an electromagnetic field, the sensor elements can be light sensors, for instance.

The invention claimed is:

1. A position encoder arrangement configured to detect the position of a movable source based on a source field, which is a magnetic field or an electric field, emitted by the source, the position encoder arrangement comprising
a number of sensor elements, with the sensor elements being arranged with a known geometrical distribution and each sensor element being configured to provide a sensor value based on the source field; and
an evaluation unit configured to:
determine, based on the sensor values, a fine position value indicating a position of the movable source;
generate from the sensor values a sensor array of binary signals, with each binary signal corresponding to one of the sensor values and indicating whether the corresponding sensor value is smaller or larger than a threshold value; and
determine, based on the sensor array, a trustworthiness of the fine position value and an error flag indicating whether a failure status of the position encoder arrangement is present,
wherein for determining the error flag:
a movement range of the movable source is partitioned into a number of position sectors corresponding to the number of sensor elements, with the position sectors being of known size and each of the position sectors being assigned to a distinct sector array; and
the evaluation unit is configured to match the sensor array against each of the sector arrays, record the result of the matching in a pattern array, and determine the error flag based on the pattern array.

2. The position encoder arrangement according to claim 1, wherein
the pattern array consists of a number of bits with the number of bits corresponding to the number of position sectors;
each bit of the pattern array corresponds to one of the position sectors and indicates whether the sensor array coincides with the respective sector array; and
the error flag is determined based on coincides sector arrays.

3. The position encoder arrangement according to claim 2, wherein the error flag signals:
no warning if a fixed number of adjacent bits of the pattern array as the only bits imply coinciding sector arrays;
a warning indicating a disturbance if at least one but less than the fixed number of adjacent bits of the pattern array as the only bits imply coinciding sector arrays; and
an error otherwise.

4. The position encoder arrangement according to claim 3, wherein the fixed number is three.

5. The position encoder arrangement according to claim 2, wherein for determining the trustworthiness the evaluation unit is configured to:
determine an effective sector value from the pattern array;
determine from the effective sector value a coarse position value indicating the position of the movable source;
determine a deviation between the coarse position value and the fine position value;
and
determine, based on the deviation, a further error flag indicating the trustworthiness.

6. The position encoder arrangement according to claim 1, wherein the position encoder is
a linear position encoder; or
a rotary position encoder, wherein the position of the movable source corresponds to a rotation angle of the movable source.

7. The position encoder arrangement according to claim 1, wherein
the source field is a magnetic field; and
the evaluation unit is further configured to compensate the sensor values for a stray field in the analog domain or in the digital domain.

8. The position encoder arrangement according to claim 1, wherein the evaluation unit is further configured to compensate the sensor values for an external background field.

9. The position encoder arrangement according to claim 1, wherein the sensor values are generated simultaneously or within a given time.

10. The position encoder arrangement according to claim 1, wherein
the evaluation unit is further configured to adapt the fine position value based on the error flag.

11. The position encoder arrangement according to claim 1, wherein the sensor elements are evenly distributed.

12. The position encoder arrangement according to claim 1, wherein the position sectors are of equal size.

13. A method for determining a failure status of a position encoder arrangement with a number of sensor elements arranged with a known geometrical distribution and a movable source emitting a source field, which is an electric field or a magnetic field, the method comprising:

generating from sensor values provided by the sensor elements based on the source field a fine position value indicating a position of the movable source;

generating from the sensor values a sensor array of binary signals, with each binary signal corresponding to one of the sensor values and indicating whether the corresponding sensor value is smaller or larger than a threshold value; and determining, based on the sensor array, a trustworthiness of the fine position value and an error flag indicating whether a failure status of the position encoder arrangement is present, wherein determining the error flag comprises:

partitioning a movement range of the movable source into a number of position sectors corresponding to the number of sensor elements, with the position sectors being of known size and each of the position sectors being assigned to a distinct sector array;

comparing the sensor array to each of the sector arrays;

recording the comparison result in a pattern array; and determining the error flag based on the pattern array.

14. The method according to claim 11, wherein the pattern array consists of a number of bits with the number of bits corresponding to the number of position sectors;

each bit of the pattern array corresponds to one of the position sectors and indicates whether the comparison result of the sensor array with the respective sector array is positive or negative; and the error flag is determined based on the positive comparison results.

15. The method according to claim 13, wherein the method further comprises compensating the sensor values for an external background field.

16. The method according to claim 13, wherein the source field is a magnetic field and the method further comprises compensating the sensor values for a stray field in the analog domain or in the digital domain.

\* \* \* \* \*

UNITED STATES PATENT AND TRADEMARK OFFICE
CERTIFICATE OF CORRECTION

PATENT NO. : 11,473,932 B2
APPLICATION NO. : 16/972078
DATED : October 18, 2022
INVENTOR(S) : Stephan Michelitsch et al.

Page 1 of 1

It is certified that error appears in the above-identified patent and that said Letters Patent is hereby corrected as shown below:

In the Claims

At Column 12, Line 3, "claim 11" should be --claim 13--.

Signed and Sealed this
Twenty-fourth Day of January, 2023

Katherine Kelly Vidal
*Director of the United States Patent and Trademark Office*